United States Patent
Uchino et al.

(10) Patent No.: US 9,832,660 B2
(45) Date of Patent: Nov. 28, 2017

(54) MOBILE COMMUNICATION METHOD

(71) Applicant: NTT DOCOMO, INC., Tokyo (JP)

(72) Inventors: Tooru Uchino, Tokyo (JP); Yoshihisa Kishiyama, Tokyo (JP); Lan Chen, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 140 days.

(21) Appl. No.: 14/913,059

(22) PCT Filed: Aug. 20, 2014

(86) PCT No.: PCT/JP2014/071778
§ 371 (c)(1),
(2) Date: Feb. 19, 2016

(87) PCT Pub. No.: WO2015/025888
PCT Pub. Date: Feb. 26, 2015

(65) Prior Publication Data
US 2016/0205603 A1 Jul. 14, 2016

(30) Foreign Application Priority Data

Aug. 21, 2013 (JP) .................................. 2013-171400

(51) Int. Cl.
*H04W 36/04* (2009.01)
*H04W 16/32* (2009.01)
(Continued)

(52) U.S. Cl.
CPC ........... *H04W 16/32* (2013.01); *H04W 24/10* (2013.01); *H04W 28/14* (2013.01); *H04W 36/02* (2013.01);
(Continued)

(58) Field of Classification Search
CPC .. H04B 7/18541; H04L 47/767; H04W 36/00; H04W 36/0005; H04W 36/0016;
(Continued)

(56) References Cited

U.S. PATENT DOCUMENTS

2010/0330994 A1* 12/2010 Matsuo ................ H04J 11/0069
455/436
2014/0204771 A1* 7/2014 Gao ...................... H04W 36/28
370/252
(Continued)

FOREIGN PATENT DOCUMENTS

JP          2011-124951 A      6/2011
JP          2011130089 A       6/2011

OTHER PUBLICATIONS

International Search Report issued in corresponding application No. PCT/JP2014/071778 dated Nov. 11, 2014 (4 pages).
(Continued)

*Primary Examiner* — Robert Lopata
(74) *Attorney, Agent, or Firm* — Osha Liang LLP

(57) ABSTRACT

In switching a radio base station (SeNB) from a radio base station (SeNB#1) to a radio base station (SeNB#2) in an "Inter-node UP aggregation", the occurrence of transmission delay of downlink data to a mobile station (UE) is avoided. A mobile communication method according to the present invention includes: stopping, by the radio base station (SeNB#1), scheduling of downlink data to the mobile station (UE), and sending an "SeNB change command" to the mobile station (UE), when receiving an "SeNB change request ack" from the radio base station (SeNB#2); notifying, by the mobile station (UE), a radio base station (MeNB) of at least one of already received downlink data and unreceived downlink data; and resending, by the radio base station (MeNB), the mobile station the downlink data that is
(Continued)

not received by the mobile station (UE) in response to the notification.

7 Claims, 17 Drawing Sheets

(51) Int. Cl.
  *H04W 24/10* (2009.01)
  *H04W 36/08* (2009.01)
  *H04W 28/14* (2009.01)
  *H04W 36/02* (2009.01)
  *H04W 36/28* (2009.01)
(52) U.S. Cl.
  CPC ........... *H04W 36/08* (2013.01); *H04W 36/28* (2013.01); *H04W 36/04* (2013.01)
(58) Field of Classification Search
  CPC ..... H04W 16/32; H04W 24/10; H04W 28/14; H04W 36/02; H04W 36/04; H04W 36/08; H04W 36/28
  USPC .......................................................... 370/331
  See application file for complete search history.

(56) References Cited

U.S. PATENT DOCUMENTS

| | | | | |
|---|---|---|---|---|
| 2014/0220974 A1* | 8/2014 | Hsu | ................... | H04W 36/0088 455/436 |
| 2014/0328182 A1* | 11/2014 | Gao | ..................... | H04W 28/08 370/236 |
| 2014/0334371 A1* | 11/2014 | Kim | .................. | H04W 52/0206 370/311 |
| 2015/0031369 A1* | 1/2015 | Gunnarsson | .......... | H04W 36/04 455/438 |
| 2015/0043435 A1* | 2/2015 | Blankenship | ......... | H04L 69/322 370/329 |
| 2015/0055620 A1* | 2/2015 | Vesterinen | ............ | H04W 36/18 370/331 |
| 2015/0319667 A1* | 11/2015 | Dalsgaard | ............. | H04W 24/10 455/444 |
| 2015/0358872 A1* | 12/2015 | Grech | ............... | H04W 36/0072 455/444 |
| 2015/0365860 A1* | 12/2015 | Yu | ......................... | H04W 36/04 455/444 |
| 2016/0014626 A1* | 1/2016 | Yi | ........................ | H04J 11/0053 370/252 |
| 2016/0044548 A1* | 2/2016 | Choi | ..................... | H04W 36/04 370/331 |
| 2016/0157148 A1* | 6/2016 | Kato | ................. | H04W 36/0055 455/444 |
| 2016/0165499 A1* | 6/2016 | Xu | ........................ | H04W 36/02 370/331 |
| 2016/0183135 A1* | 6/2016 | Kang | .................. | H04W 76/025 455/444 |
| 2016/0192245 A1* | 6/2016 | He | ..................... | H04W 36/0033 370/331 |
| 2016/0205602 A1* | 7/2016 | Uchino | ................. | H04W 16/32 370/331 |
| 2017/0181035 A1* | 6/2017 | Gao | ..................... | H04W 28/08 |
| 2017/0215125 A1* | 7/2017 | Wu | ....................... | H04W 72/04 |

OTHER PUBLICATIONS

Written Opinion of the International Searching Authority issued in corresponding application No. PCT/JP2014/071778 dated Nov. 11, 2014 (4 pages).
ZTE Corporation, "Mobility Enhancement for Small Cell"; 3GPP TSG-RAN2 Meeting #81, Tdoc R2-130135; St. Julian's, Malta, Jan. 28-Feb. 1, 2013 (8 pages).
Broadcom Corporation, "Mobility for dual connectivity"; 3GPP TSG RAN WG2 Meeting #81bis, R2-130990; Chicago, USA, Apr. 15-19, 2013 (6 pages).
Huawei, HiSilicon, "Throughput results for inter-frequency deployment of small cells"; 3GPP TSG-RAN WG2 Meeting #82, R2-131782; Fukuoka, Japan, May 20-24, 2013 (5 pages).
Huawei, HiSilicon, "Analysis of Latency Related Issues for UP Protocol Alternatives"; 3GPP TSG-RAN WG2 Meeting #82, R2-131786; Fukuoka, Japan, May 20-24, 2013 (6 pages).
Nokia Corporation, NSN, "Mobility enhancement for non-CA capable UE"; 3GPP TSG-RAN WG2 Meeting #83, R2-132416; Barcelona, Spain, Aug. 19-23, 2013 (3 pages).

* cited by examiner

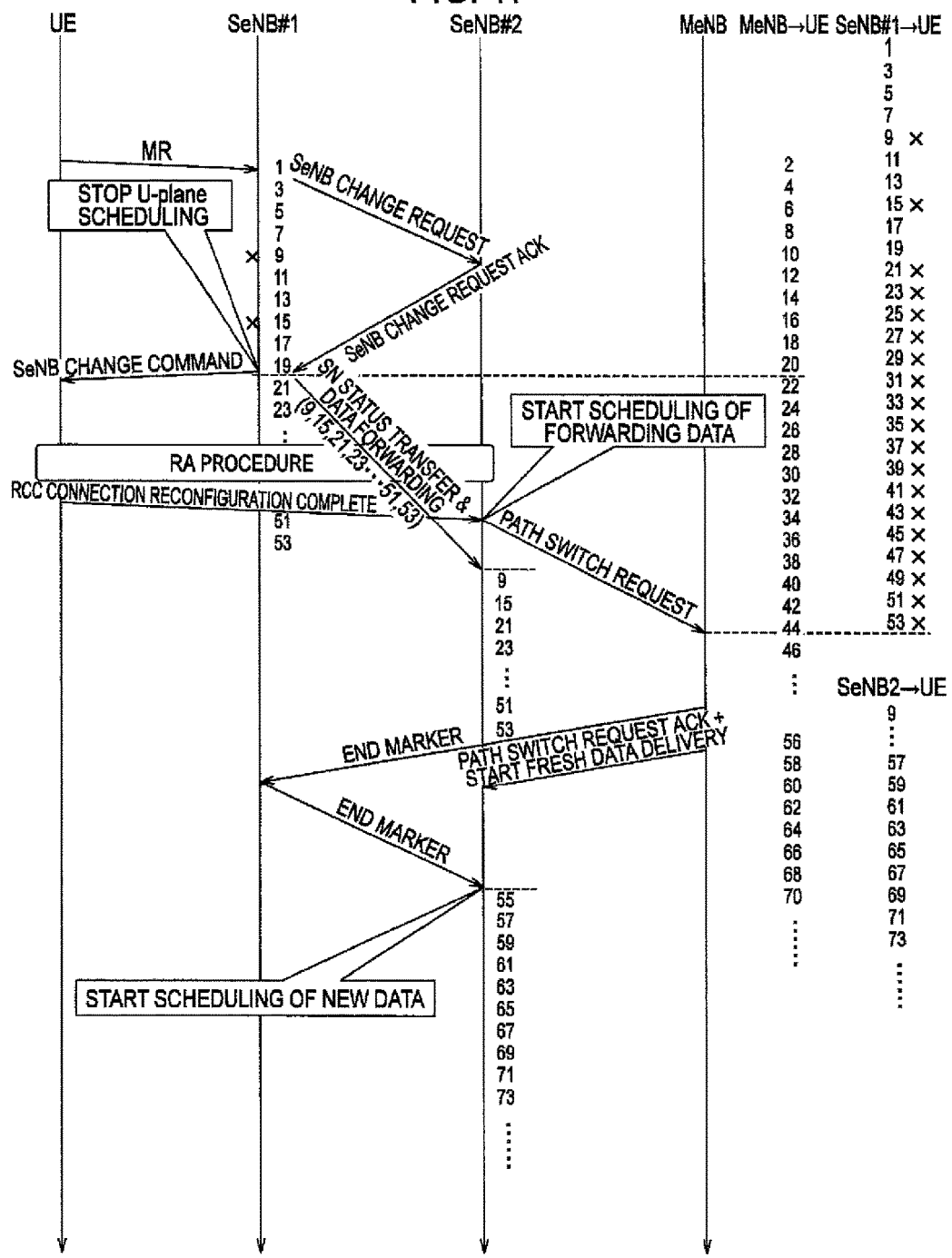

MOBILE COMMUNICATION METHOD

TECHNICAL FIELD

The present invention relates to a mobile communication method.

BACKGROUND ART

In LTE (Long Term Evolution), a handover control is specified in order that a mobile station UE can perform communications in an optimal cell even when the mobile station UE moves (see FIG. 13).

Moreover, CA (Carrier Aggregation) specified until LTE Release-10 is able to achieve the high throughput by performing simultaneous communication using a CC (Component Carrier)#1 and a CC#2 under the same radio base station eNB, as illustrated in FIG. 14(a).

Meanwhile, in LTE Release-12, discussed is "Inter-node UP aggregation" to which the CA until LTE Release-10 is further extended. The "Inter-node UP aggregation" achieves high throughput by performing simultaneous communication using a CC#1 and a CC#2 respectively under different radio base stations eNB#1 and eNB#2, as illustrated in FIG. 14(b) (see Non-patent document 1).

For example, if all the CCs cannot be accommodated in a single radio base station eNB, it is necessary to perform the "Inter-node UP aggregation" in order to achieve the throughput comparable to that of LTE Release-10.

Further, in the "Inter-node UP aggregation", an anchoring node is expected to distribute downlink data to transmit the downlink data to a mobile station UE.

For example, a radio base station MeNB that manages a macro cell is an anchoring node in an example of FIG. 15(a), and a gateway device S-GW is an anchoring node in an example of FIG. 15(b).

PRIOR ART DOCUMENT

Non-Patent Document

Non-patent document 1: 3GPP TDocs (written contribution) R2-131782

SUMMARY OF THE INVENTION

In one conceivable way of "Inter-node UP aggregation", an existing handover control may be applied in order to switch a radio base station SeNB managing a small cell. However, as illustrated in FIG. 16, low-speed lines such as xDSLs are supposed to be used as backhaul lines between the radio base station MeNB and the radio base stations SeNB.

In this case, downlink data which is retained in a switching-source radio base station SeNB#1 and for which positive acknowledgement information is not yet received is consequently forwarded to a switching-target radio base station SeNB#2 via the backhaul line of a low-speed line as described above. Thereby, there has been a problem that the forwarding takes a long time.

Specifically, as illustrated in FIG. 17, in switching a radio base station SeNB from the radio base station SeNB#1 to the radio base station SeNB#2, the radio base station SeNB#1 stops scheduling of downlink data to an mobile station UE upon receiving an "SeNB change request ack" from the radio base station SeNB#2, and forwards the downlink data the transmission of which to the mobile station UE is not completed (the positive acknowledgement information is not received) to the radio base station SeNB#2.

Here, the downlink data is forwarded from the radio base station SeNB#1 to the radio base station SeNB#2 via the above-described backhaul line. Hence, the forwarding time becomes so long that there has been a problem in that transmission delay of the downlink data to the mobile station UE occurs.

Therefore, the present invention has been made in view of the problem described above, and an objective thereof is to provide a mobile communication method capable of prevent occurrence of transmission delay of the downlink data to the mobile station UE in switching a radio base station SeNB from a radio base station SeNB#1 to another radio base station SeNB#2.

A first feature of the present invention is summarized as a mobile communication method to be executed when a mobile station performs carrier aggregation using a macro cell under a macro-cell radio base station and a small cell under a first small-cell radio base station, the method including: buffering, by the macro-cell radio base station, entire downlink data to be transmitted via the first small-cell radio base station to the mobile station; sending, by the first small-cell radio base station, a second small-cell radio base station a switching request that requests small-cell radio base station switching, when receiving a measurement report from the mobile station; stopping, by the first small-cell radio base station, scheduling of downlink data to the mobile station, and send the mobile station a switching instruction instructing the small-cell radio base station switching, when receiving a switching request response from the second small-cell radio base station; notifying, by the mobile station, the macro-cell radio base station of at least one of already received downlink data and unreceived downlink data in response to the switching instruction; and resending, by the macro-cell radio base station, the mobile station downlink data that is not received by the mobile station, in response to the notification.

A second feature of the present invention is summarized as a mobile communication method to be executed when a mobile station performs carrier aggregation using a macro cell under a macro-cell radio base station and a small cell under a first small-cell radio base station, the method including: buffering, by the macro-cell radio base station, entire downlink data to be transmitted via the first small-cell radio base station to the mobile station; notifying, by the mobile station, the macro-cell radio base station of at least one of already received downlink data and unreceived downlink data, when sending a measurement report to the first small-cell radio base station; resending, by the macro-cell radio base station, the mobile station downlink data that is not received by the mobile station, in response to the notification; sending, by the first small-cell radio base station, a second small-cell radio base station a switching request that requests small-cell radio base station switching, when receiving the measurement report from the mobile station; and stopping, by the first small-cell radio base station, scheduling of downlink data to the mobile station, and sending the mobile station a switching instruction instructing the small-cell radio base station switching, when receiving a switching request response from the second small-cell radio base station.

A third feature of the present invention is summarized as a mobile communication method to be executed when a mobile station performs carrier aggregation using a macro cell under a macro-cell radio base station and a small cell under a first small-cell radio base station, the method including: buffering, by the macro-cell radio base station, entire downlink data to be transmitted via the first small-cell radio base station to the mobile station; notifying, by the mobile station, the macro-cell radio base station of at least one of already received downlink data and unreceived downlink data, when detecting quality degradation of a radio link with the first small-cell radio base station; resending, by the macro-cell radio base station, the mobile station downlink data that is not received by the mobile station, in response to the notification; sending, by the first small-cell radio base station, a second small-cell radio base station a switching request that requests small-cell radio base station switching, when receiving a measurement report from the mobile station; and stopping, by the first small-cell radio base station, scheduling of downlink data to the mobile station, and sending the mobile station a switching instruction instructing the small-cell radio base station switching, when receiving a switching request response from the second small-cell radio base station.

A fourth feature of the present invention is summarized as a mobile communication method to be executed when a mobile station performs carrier aggregation using a macro cell under a macro-cell radio base station and a small cell under a first small-cell radio base station, the method including: buffering, by the macro-cell radio base station, entire downlink data to be transmitted via the first small-cell radio base station to the mobile station; sending, by the first small-cell radio base station, a second small-cell radio base station a switching request that requests small-cell radio base station switching, and notifying the macro-cell radio base station of at least one of downlink data the transmission of which to the mobile station is completed and downlink data the transmission of which to the mobile station is not completed, when receiving a measurement report from the mobile station; resending, by the macro-cell radio base station, the mobile station the downlink data the transmission of which to the mobile station is not completed, in response to the notification; and stopping, by the first small-cell radio base station, scheduling of downlink data to the mobile station, and sending the mobile station a switching instruction instructing the small-cell radio base station switching, when receiving a switching request response from the second small-cell radio base station.

A fifth feature of the present invention is summarized as a mobile communication method to be executed when a mobile station performs carrier aggregation using a macro cell under a macro-cell radio base station and a small cell under a first small-cell radio base station, the method including: buffering, by the macro-cell radio base station, entire downlink data to be transmitted via the first small-cell radio base station to the mobile station; notifying, by the first small-cell radio base station, the macro-cell radio base station of at least one of downlink data the transmission of which to the mobile station is completed and downlink data the transmission of which to the mobile station is not completed, when detecting quality degradation of a radio link with the mobile station; resending, by the macro-cell radio base station, the mobile station the downlink data the transmission of which to the mobile station is not completed, in response to the notification; sending, by the first small-cell radio base station, a second small-cell radio base station a switching request that requests small-cell radio base station switching, when receiving a measurement report from the mobile station; and stopping, by the first small-cell radio base station, scheduling of downlink data to the mobile station, and sending the mobile station a switching instruction instructing the small-cell radio base station switching, when receiving a switching request response from the second small-cell radio base station.

A sixth feature of the present invention is summarized as a mobile communication method to be executed when a mobile station performs carrier aggregation using a macro cell under a macro-cell radio base station and a small cell under a first small-cell radio base station, the method including: sending, by either one of the macro-cell radio base station and a gateway device, downlink data via the first small-cell radio base station to the mobile station without buffering, by the macro-cell radio base station, the downlink data; forwarding, by the first small-cell radio base station, downlink data, the transmission of which to the mobile station is not completed, to the macro-cell radio base station, and sending a second small-cell radio base station a switching request that requests small-cell radio base station switching, when receiving a measurement report from the mobile station; resending, by the macro-cell radio base station, the mobile station the downlink data forwarded by the first small-cell radio base station; and stopping, by the first small-cell radio base station, scheduling of downlink data to the mobile station, and sending the mobile station a switching instruction instructing the small-cell radio base station switching, when receiving a switching request response from the second small-cell radio base station.

A seventh feature of the present invention is summarized as a mobile communication method to be executed when a mobile station performs carrier aggregation using a macro cell under a macro-cell radio base station and a small cell under a first small-cell radio base station, the method including: sending, by either one of the macro-cell radio base station and a gateway device, downlink data via the first small-cell radio base station to the mobile station without buffering, by the macro-cell radio base station, the downlink data; forwarding, by the first small-cell radio base station, downlink data, the transmission of which to the mobile station is not completed, to the macro-cell radio base station, when detecting quality degradation of a radio link with the mobile station; resending, by the macro-cell radio base station, the mobile station the downlink data forwarded by the first small-cell radio base station; sending, by the first small-cell radio base station, a second small-cell radio base station a switching request that requests small-cell radio base station switching, when receiving a measurement report from the mobile station; and stopping, by the first small-cell radio base station, scheduling of downlink data to the mobile station, and sending the mobile station a switching instruction instructing the small-cell radio base station switching, when receiving a switching request response from the second small-cell radio base station.

BRIEF DESCRIPTION OF THE DRAWINGS

FIG. 17 is a diagram for explaining handover control processing in the "Inter-node UP aggregation".

DETAILED DESCRIPTION

First Embodiment of the Present Invention

A mobile communication system according to a first embodiment of the present invention is described with reference to FIGS. 1 to 5.

Figure 1:
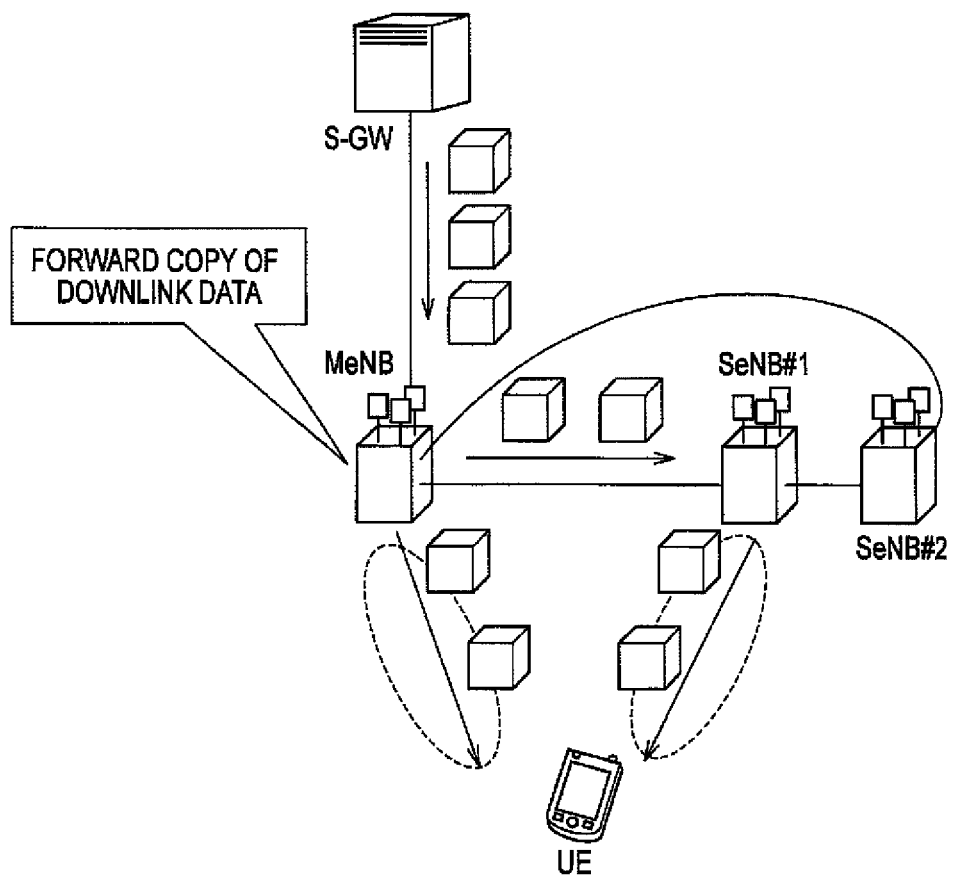
FIG. 1 is an overall configuration diagram of a mobile communication system according to a first embodiment of the present invention.

As illustrated in FIG. 1, the mobile communication system according to the present embodiment is a mobile communication system of LTE, and includes a gateway device S-GW, a radio base station MeNB that manages a macro cell, a radio base station SeNB#1 that manages a small cell #1, a radio base station SeNB#2 that manages a small cell #2, and a mobile station UE.

In the mobile communication system according to the present embodiment, the mobile station UE is configured to be capable of performing CA using a CC under the radio base station MeNB and a CC under the radio base station SeNB#1 (or, a CC under the radio base station SeNB#2).

In other words, the mobile communication system according to the present embodiment is configured to be capable of performing the "Inter-node UP aggregation".

Moreover, as illustrated in FIG. 1, the mobile communication system according to the present embodiment is configured such that when the mobile station UE performs the "Inter-node UP aggregation" with the radio base station MeNB and the radio base station SeNB#1, the radio base station MeNB buffers entire downlink data to be transmitted via the radio base station SeNB#1 to the mobile station UE.

In other words, in this state, the radio base station MeNB is an anchoring node, and may be configured to forward a copy of the above-described downlink data to the radio base station SeNB#1.

Figure 2:
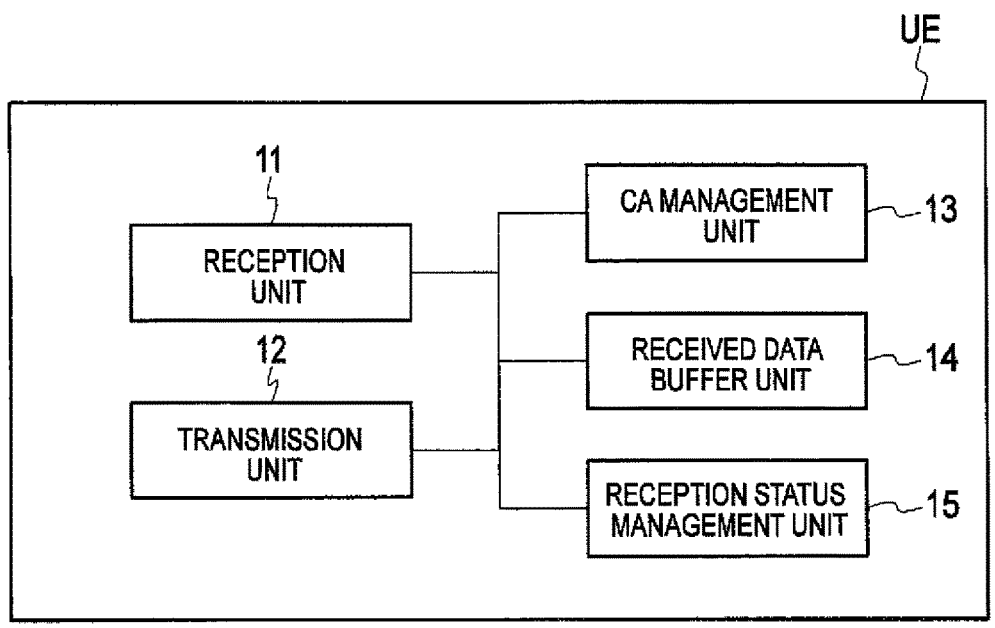
FIG. 2 is a function block diagram of a mobile station according to the first embodiment of the present invention.

As illustrated in FIG. 2, the mobile station UE according to the present embodiment includes a reception unit 11, a transmission unit 12, a CA management unit 13, a received data buffer unit 14, and a reception status management unit 15.

The reception unit 11 is configured to receive various signals transmitted by the radio base station MeNB, the radio base station SeNB#1, and the radio base station SeNB#2. The transmission unit 12 is configured to transmit various signals to the radio base station MeNB, the radio base station SeNB#1, and the radio base station SeNB#2.

The CA management unit 13 is configured to perform control and management for the above-described CA, in other words, the "Inter-node UP aggregation", in cooperation with the reception unit 11 and the transmission unit 12.

The received data buffer unit 14 is configured to buffer downlink data (PDCP-PDU) that is received by the reception unit 11.

The reception status management unit 15 is configured to manage a reception status of the downlink data (sequence numbers of PDCP-PDUs) by the reception unit 11.

Hereinafter, an operation of the mobile communication system according to the present embodiment is described with reference to FIGS. 3 to 5. Specifically, with reference to FIGS. 3 to 5, description is provided for an operation of switching a radio base station SeNB from the radio base station SeNB#1 to the radio base station SeNB#2 when the "Inter-node UP aggregation" is performed in the mobile communication system according to the present embodiment.

Figure 3:
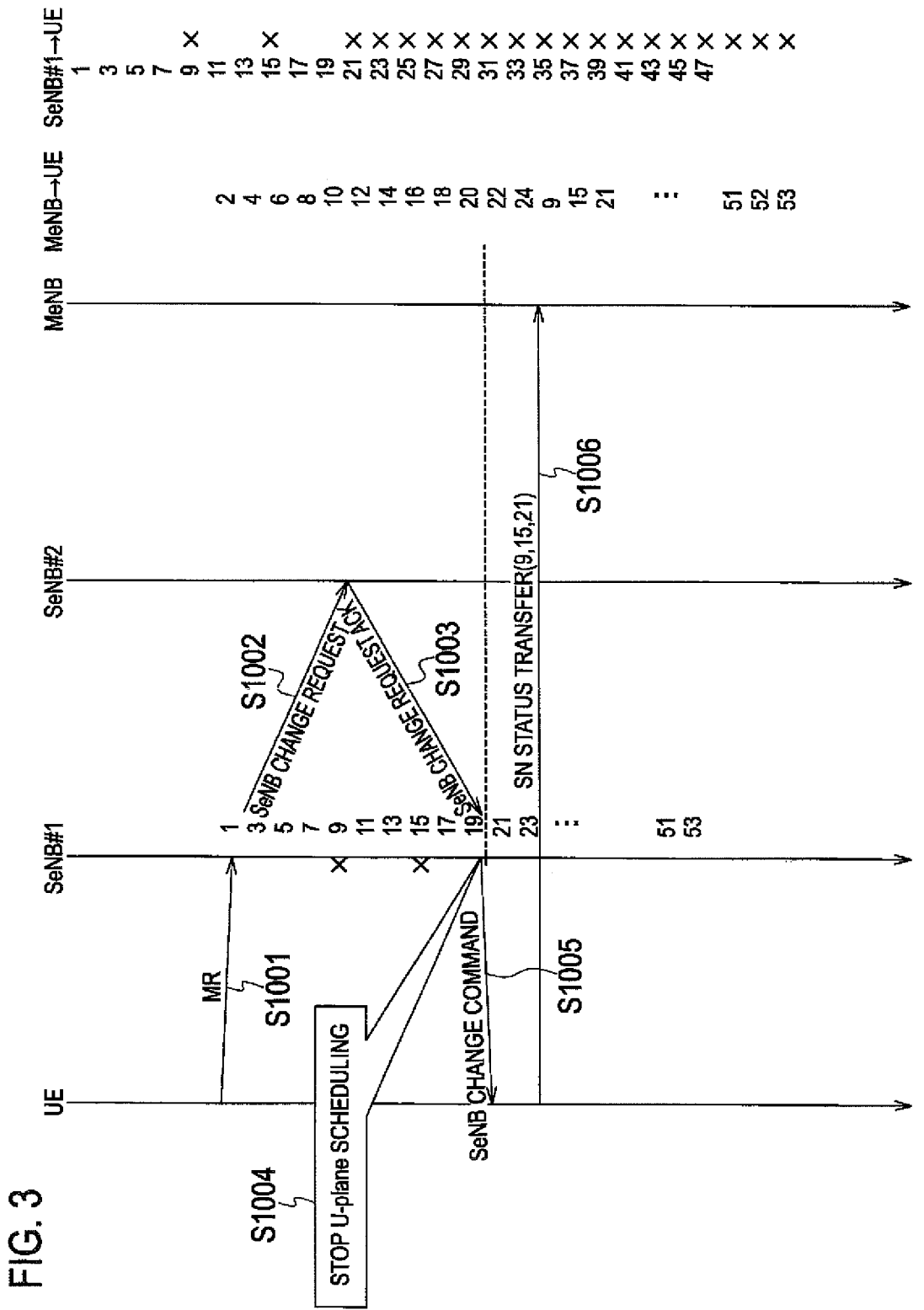
FIG. 3 is a sequence diagram illustrating an example of an operation (operation example 1) by the mobile communication system according to the first embodiment of the present invention.

Firstly, with reference to FIG. 3, an operation example 1 of the mobile communication system according to the present embodiment is described.

As illustrated in FIG. 3, the radio base station SeNB#1 receives a "Measurement Report" from the mobile station UE at Step S1001, and when determining to switch the radio base station SeNB from the radio base station SeNB#1 to the radio base station SeNB#2, sends the radio base station SeNB#2 an "SeNB change request" that requests switching of the radio base station SeNB at Step S1002.

Thereafter, upon receiving an "SeNB change request ack" from the radio base station SeNB#2 at Step S1003, the radio base station SeNB#1 stops scheduling of downlink data to the mobile station UE at Step S1004, and sends an "SeNB change command" to the mobile station UE at Step S1005.

At Step S1006, the mobile station UE sends an "SN status transfer" that notifies the radio base station MeNB of at least one of unreceived downlink data (in an example of FIG. 3, PDCP-PDUs of sequence numbers "9", "15", and "21") and already received downlink data, to the radio base station MeNB, in response to the "SeNB change command". Further, it can be considered that the reception status management unit 15 of the mobile station UE manages the reception status of the downlink data (sequence numbers of PDCP-PDUs) by the reception unit 11, and thus, may notify the radio base station MeNB of, for example, a missing sequence number of an unreceived PDCP-PDU, as unreceived downlink data.

Here, an "SN status transfer" illustrated in FIG. 3 indicates that PDCP-PDUs of sequence numbers "21" and later is not received. The mobile station UE may notify the radio base station MeNB of unreceived downlink data using a "PDCP status report" or the like, instead of the "SN status transfer".

In response to the notification by the "SN status transfer", the radio base station MeNB resends the mobile station UE downlink data that is not received by the mobile station UE (in the example of FIG. 3, PDCP-PDUs of sequence numbers "9", "15", and "21" to "53").

Further, in this operation example 1, the radio base station SeNB#1 may discard downlink data which is retained and the transmission of which to the mobile station UE is not completed (the positive acknowledgement information is not received).

Subsequent operations are similar to the operations (operations subsequent to a Path switch request) illustrated in FIG. 17.

Figure 4:
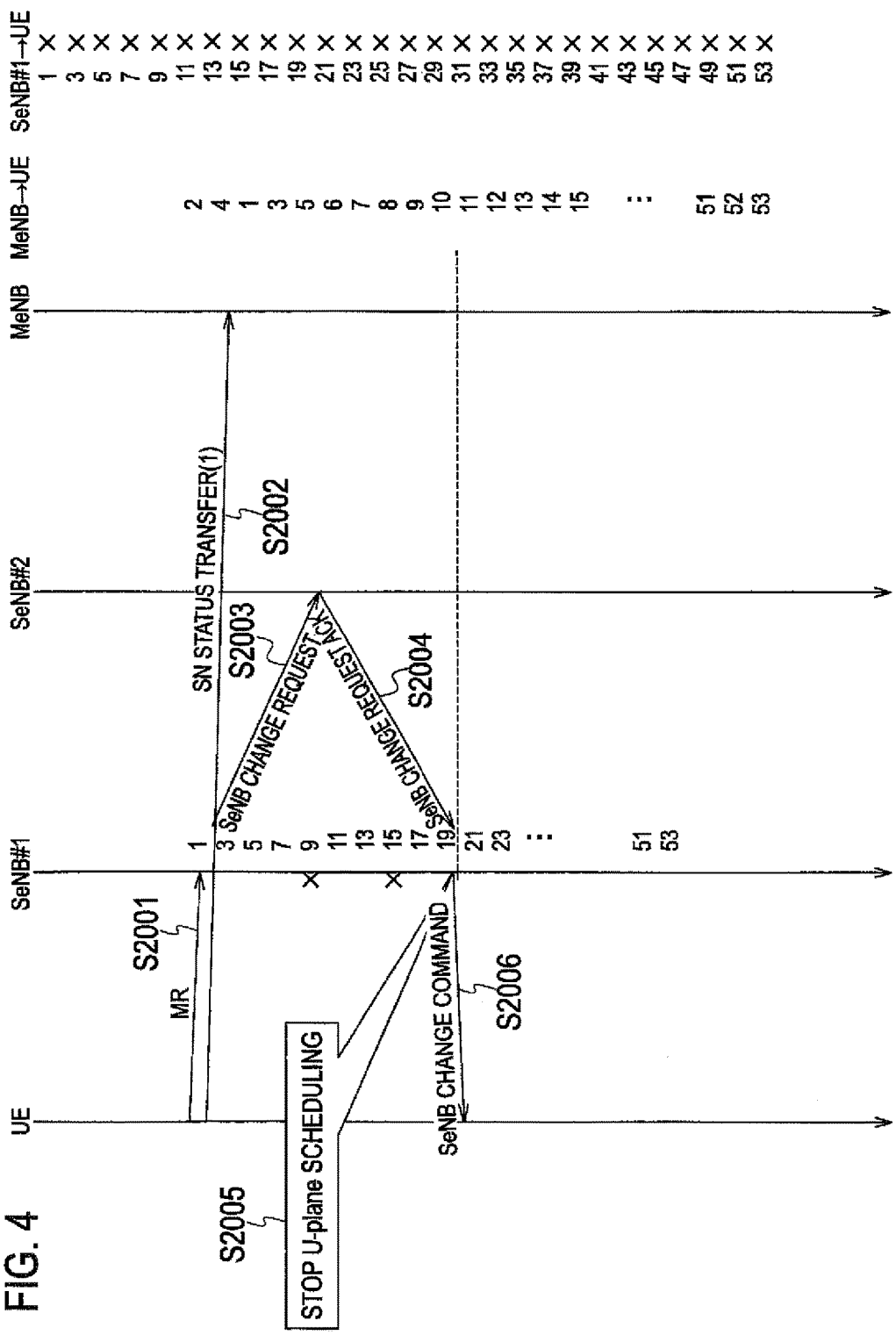
FIG. 4 is a sequence diagram illustrating an example of an operation (operation example 2) by the mobile communication system according to the first embodiment of the present invention.

Secondly, with reference to FIG. 4, an operation example 2 of the mobile communication system according to the present embodiment is described.

As illustrated in FIG. 4, the mobile station UE sends a "Measurement Report" to the radio base station SeNB#1 at Step S2001, and sends the radio base station MeNB an "SN status transfer" that notifies the radio base station MeNB of at least one of unreceived downlink data (in an example of FIG. 4, a PDCP-PDU of a sequence number "1") and already received downlink data at Step S2002.

Here, an "SN status transfer" illustrated in FIG. 4 indicates that PDCP-PDUs of sequence numbers "1" and later is not received. The mobile station UE may notify the radio base station MeNB of unreceived downlink data using a "PDCP status report" or the like, instead of the "SN status transfer".

Further, the mobile station UE may send the above-described "SN status transfer" at a time point when the mobile station UE receives MAC-ACK or RLC-ACK responding to the above-described "Measurement Report" from the radio base station SeNB#1.

In response to the notification by the "SN status transfer", the radio base station MeNB resends the mobile station UE downlink data that is not received by the mobile station UE (in the example of FIG. 4, PDCP-PDUs of sequence numbers "1" to "53").

Further, in this operation example 2, the radio base station SeNB#1 may discard downlink data which is retained and the transmission of which to the mobile station UE is not completed (the positive acknowledgement information is not received).

When determining to switch the radio base station SeNB from the radio base station SeNB#1 to the radio base station SeNB#2 in response to the "Measurement Report" received from the mobile station UE, the radio base station SeNB#1 sends the radio base station SeNB#2 an "SeNB change request" that requests switching of the radio base station SeNB at Step S2003.

Thereafter, upon receiving the "SeNB change request ack" from the radio base station SeNB#2 at Step S2004, the radio base station SeNB#1 stops scheduling of downlink data to the mobile station UE at Step S2005, and sends an "SeNB change command" to the mobile station UE at Step S2006.

Subsequent operations are similar to the operations (operations subsequent to the Path switch request) illustrated in FIG. 17.

Figure 5:
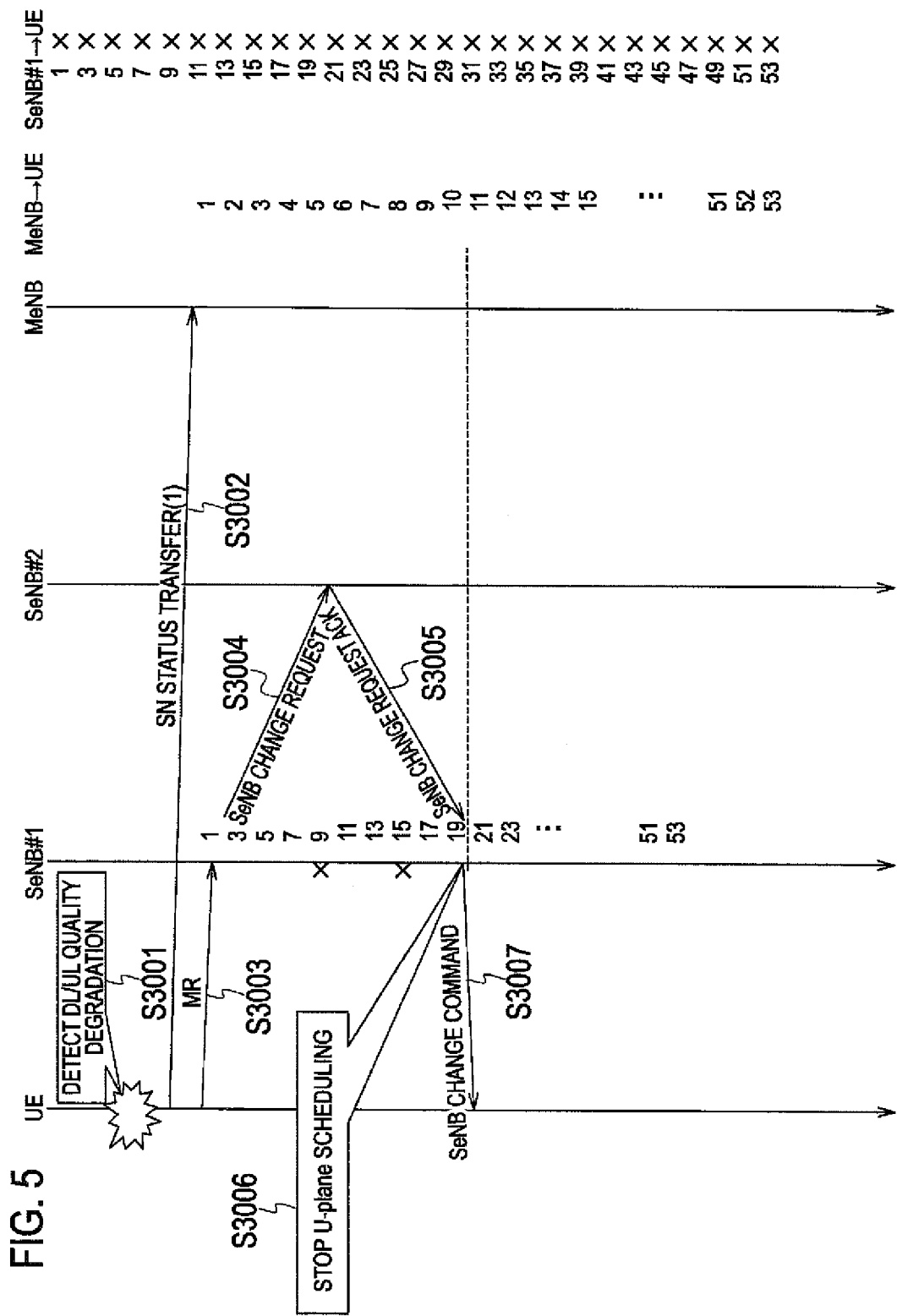
FIG. 5 is a sequence diagram illustrating an example of an operation (operation example 3) by the mobile communication system according to the first embodiment of the present invention.

Thirdly, with reference to FIG. 5, an operation example 3 of the mobile communication system according to the present embodiment is described.

As illustrated in FIG. 5, when the mobile station UE detects quality degradation of a radio link (down link and up link) with the radio base station SeNB#1 at Step S3001, the mobile station UE transmits an "SN status transfer" that notifies the radio base station MeNB of at least one of unreceived downlink data (in an example of FIG. 5, a PDCP-PDU of a sequence number "1") and already received downlink data, to the radio base station MeNB at Step S3002.

Here, an "SN status transfer" illustrated in FIG. 5 indicates that PDCP-PDUs of sequence numbers "1" and later is not received. The mobile station UE may notify the radio base station MeNB of unreceived downlink data using a "PDCP status report" or the like, instead of the "SN status transfer".

Moreover, the mobile station UE may detect the quality degradation at S3001 by observing a value of a CQI (Channel Quality Indicator), an error rate of an HARQ (Hybrid-ARQ), or the like.

The radio base station MeNB resends the mobile station UE downlink data that is not received by the mobile station UE (in the example of FIG. 5, PDCP-PDUs of sequence numbers "1" to "53"), in response to the notification by the "SN status transfer".

Thereafter, the radio base station SeNB#1 receives a "Measurement Report" from the mobile station UE at Step S3003, and when determining to switch the radio base station SeNB from the radio base station SeNB#1 to the radio base station SeNB#2, sends the radio base station SeNB#2 an "SeNB change request" that requests switching of the radio base station SeNB at Step S3004.

Thereafter, upon receiving an "SeNB change request ack" from the radio base station SeNB#2 at Step S3005, the radio base station SeNB#1 stops scheduling of downlink data to the mobile station UE at Step S3006, and sends an "SeNB change command" to the mobile station UE at Step S3007.

Subsequent operations are similar to the operations (operations subsequent to the Path switch request) illustrated in FIG. 17.

The mobile communication system according to the present embodiment is configured such that in the "Inter-node UP aggregation", when the radio base station SeNB is switched from the radio base station SeNB#1 to the radio base station SeNB#2, the mobile station UE notifies the radio base station MeNB that buffers entire downlink data destined for the mobile station UE of at least one of already received downlink data and unreceived downlink data. Accordingly, the downlink data is directly resent from the radio base station MeNB to the mobile station UE without passing through a backhaul line between the radio base station MeNB and the radio base station SeNB, so that the occurrence of transmission delay of the downlink data to the mobile station UE can be prevented.

Second Embodiment of the Present Invention

Hereinafter, with reference to FIGS. 6 to 8, a mobile communication system according to a second embodiment of the present invention is described by focusing on differences from the above-described mobile communication system according to the first embodiment.

Figure 6:
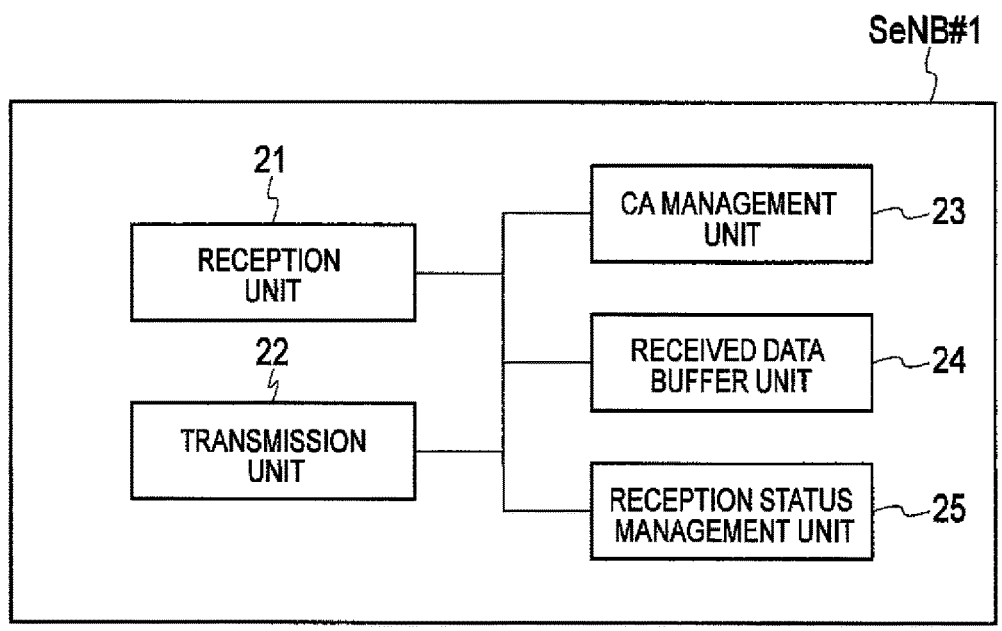
FIG. 6 is a function block diagram of a radio base station according to a second embodiment of the present invention.

As illustrated in FIG. 6, the radio base station SeNB#1 according to the present embodiment includes a reception unit 21, a transmission unit 22, a CA management unit 23, a received data buffer unit 24, a reception status management unit 25.

The reception unit 21 is configured to receive various signals transmitted by the radio base station MeNB, the radio base station SeNB#2, and the mobile station UE. The transmission unit 22 is configured to transmit various signals to the radio base station MeNB, the radio base station SeNB#2, and the mobile station UE.

The CA management unit 23 is configured to perform control and management for the above-described CA, in other words, the "Inter-node UP aggregation", in cooperation with the reception unit 21 and the transmission unit 22.

The received data buffer unit 24 is configured to buffer downlink data (PDCP-PDU) that is received by the reception unit 21.

The reception status management unit 25 is configured to manage a reception status of the downlink data (PDCP-PDU) by the mobile station UE.

Hereinafter, an operation of the mobile communication system according to the present embodiment is described with reference to FIGS. 7 and 8. Specifically, with reference to FIGS. 7 and 8, description is provided for an operation of switching the radio base station SeNB from the radio base station SeNB#1 to the radio base station SeNB#2 when the "Inter-node UP aggregation" is performed in the mobile communication system according to the present embodiment.

Figure 7:
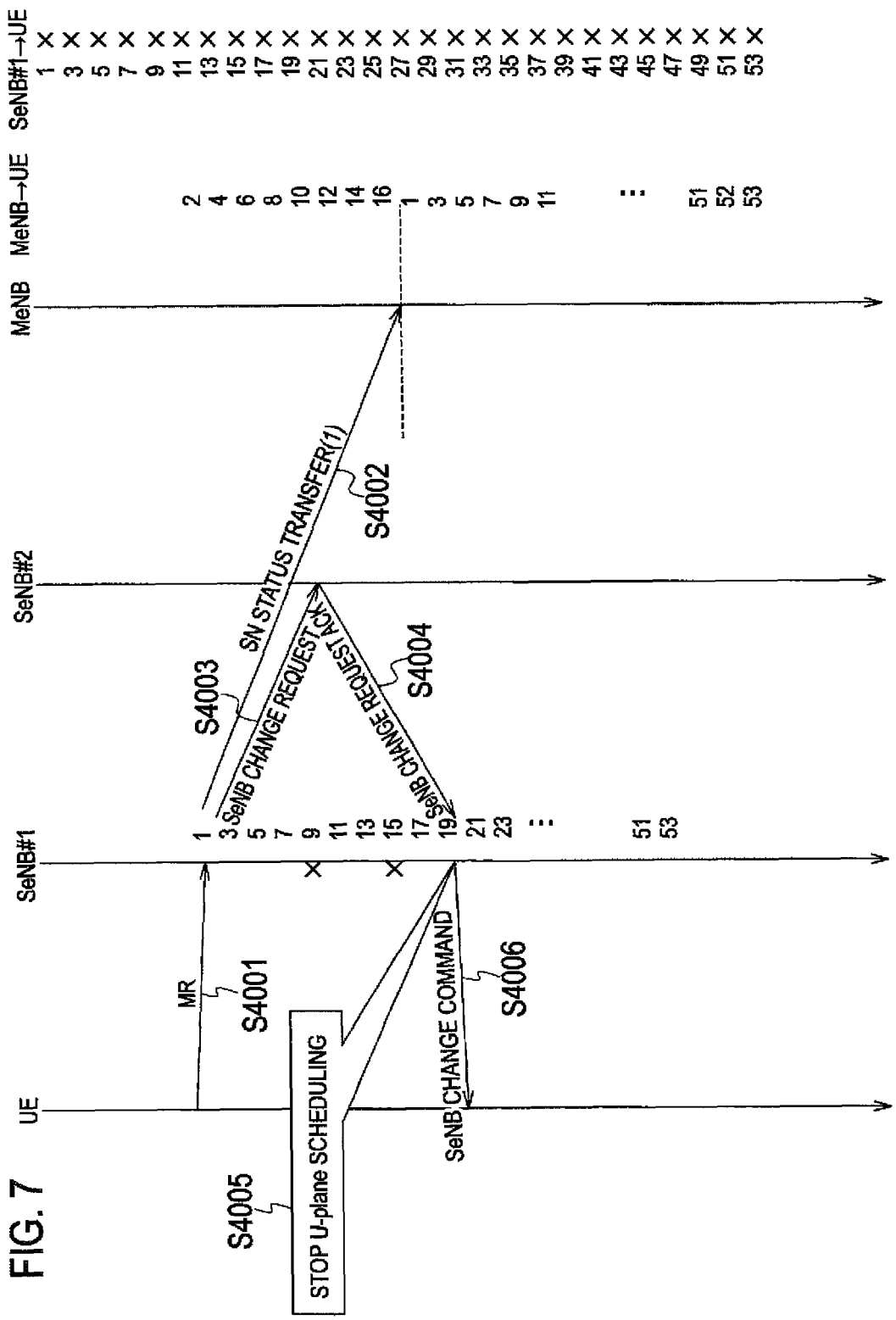
FIG. 7 is a sequence diagram illustrating an example of an operation (operation example 1) by a mobile communication system according to the second embodiment of the present invention.

Firstly, with reference to FIG. 7, an operation example 1 of the mobile communication system according to the present embodiment is described.

As illustrated in FIG. 7, the radio base station SeNB#1 receives a "Measurement Report" from the mobile station UE at Step S4001, and determines to switch the radio base station SeNB from the radio base station SeNB#1 to the radio base station SeNB#2. Accordingly, at Step S4002, the radio base station SeNB#1 sends the radio base station MeNB an "SN status transfer" that notifies the radio base station MeNB of at least one of downlink data (in an example of FIG. 7, a PDCP-PDU of a sequence number "1") the transmission of which to the mobile station UE is not completed and downlink data the transmission of which to the mobile station UE is completed. Moreover, at Step S4003, the radio base station SeNB#1 sends the radio base station SeNB#2 an "SeNB change request" that requests switching of the radio base station SeNB.

Here, an "SN status transfer" illustrated in FIG. 7 indicates that the transmission of PDCP-PDUs of sequence numbers "1" and later is not completed. The radio base station SeNB#1 may notify the radio base station MeNB of the downlink data the transmission of which is not completed using a "PDCP status report" or the like, instead of the "SN status transfer".

In response to the notification by the "SN status transfer", the radio base station MeNB resends the mobile station UE downlink data (PDCP-PDUs of sequence numbers "1" to "53" in the example of FIG. 7) the transmission of which to the mobile station UE is not completed.

Thereafter, upon receiving an "SeNB change request ack" from the radio base station SeNB#2 at Step S4004, the radio base station SeNB#1 stops scheduling of downlink data to the mobile station UE at Step S4005, and sends an "SeNB change command" to the mobile station UE at Step S4006.

Further, in this operation example 1, the radio base station SeNB#1 may discard downlink data which is retained and the transmission of which to the mobile station UE is not completed (the positive acknowledgement information is not received).

Subsequent operations are similar to the operations (operations subsequent to the Path switch request) illustrated in FIG. 17.

Figure 8:
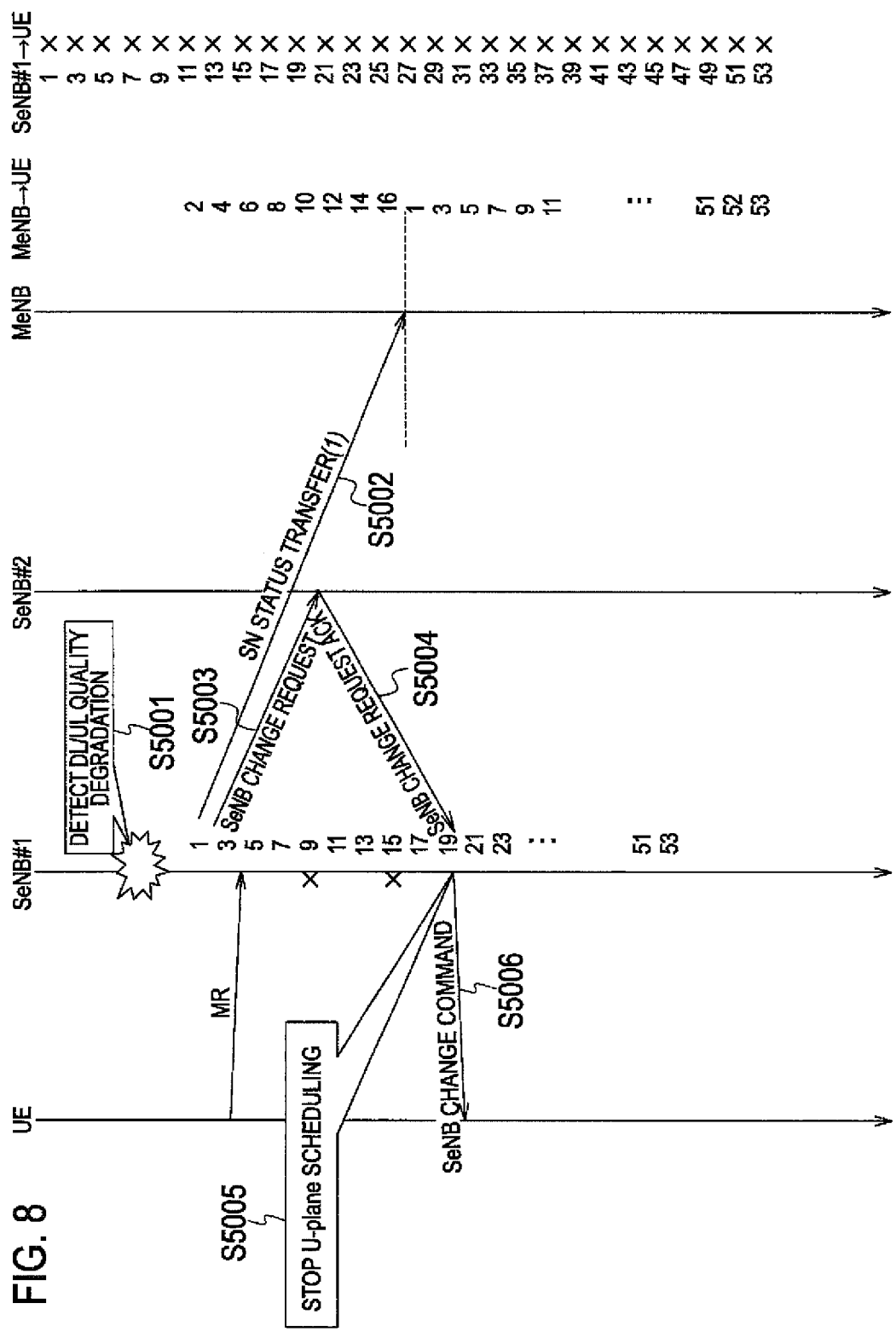
FIG. 8 is a sequence diagram illustrating an example of an operation (operation example 2) by the mobile communication system according to the second embodiment of the present invention.

Secondly, with reference to FIG. 8, an operation example 2 of the mobile communication system according to the present embodiment is described.

As illustrated in FIG. 8, when the radio base station SeNB#1 detects quality degradation of a radio link (down link and up link) with the mobile station UE at Step S5001, the radio base station SeNB#1 sends the radio base station MeNB an "SN status transfer" that notifies the radio base station MeNB of at least one of downlink-data (in an example of FIG. 8, a PDCP-PDU of a sequence number "1") the transmission of which to the mobile station UE is not completed and downlink data the transmission of which to the mobile station UE is completed at Step S5002.

Moreover, the radio base station SeNB#1 may detect the quality degradation by observing a value of CQI (Channel Quality Indicator), the reception quality of SRS (Sounding Reference Signal), an error rate of HARQ (Hybrid-ARQ), or the like.

Here, an "SN status transfer" illustrated in FIG. 8 indicates that the transmission of PDCP-PDUs of sequence numbers "1" and later is not completed. The radio base station SeNB#1 may notify the radio base station MeNB of the downlink data the transmission of which is not completed using a "PDCP status report" or the like, instead of the "SN status transfer".

In response to the notification by the "SN status transfer", the radio base station MeNB resends the mobile station UE downlink data (in the example of FIG. 8, PDCP-PDUs of sequence numbers "1" to "53") the transmission of which to the mobile station UE is not completed.

Thereafter, the radio base station SeNB#1 receives a "Measurement Report" from the mobile station UE, and when determining to switch the radio base station SeNB from the radio base station SeNB#1 to the radio base station SeNB#2, sends the radio base station SeNB#2 an "SeNB change request" that requests switching of the radio base station SeNB at Step S5003.

Upon receiving an "SeNB change request ack" from the radio base station SeNB#2 at Step S5004, the radio base station SeNB#1 stops scheduling of downlink data to the mobile station UE at Step S5005, and sends an "SeNB change command" to the mobile station UE at Step S5006.

Further, in this operation example 2, the radio base station SeNB#1 may discard downlink data which is retained and the transmission of which to the mobile station UE is not completed (the positive acknowledgement information is not received).

Subsequent operations are similar to the operations (operations subsequent to the Path switch request) illustrated in FIG. 17.

According to the mobile communication system according to the present embodiment, in switching the radio base station SeNB from the radio base station SeNB#1 to the radio base station SeNB#2 in the "Inter-node UP aggregation", the radio base station SeNB#1 notifies the radio base station MeNB that buffers entire downlink data destined for the mobile station UE of at least one of downlink data the transmission of which to the mobile station UE is completed and downlink data the transmission of which to the mobile station UE is not completed. Accordingly, the downlink data is directly resent from the radio base station MeNB to the mobile station UE without passing through a backhaul line between the radio base station MeNB and the radio base station SeNB, so that the occurrence of transmission delay of the downlink data to the mobile station UE can be prevented.

Third Embodiment of the Present Invention

Hereinafter, with reference to FIG. 9 to FIG. 12, a mobile communication system according to a third embodiment of the present invention is described by focusing on differences from the above-described mobile communication system according to the first embodiment.

Figure 9:
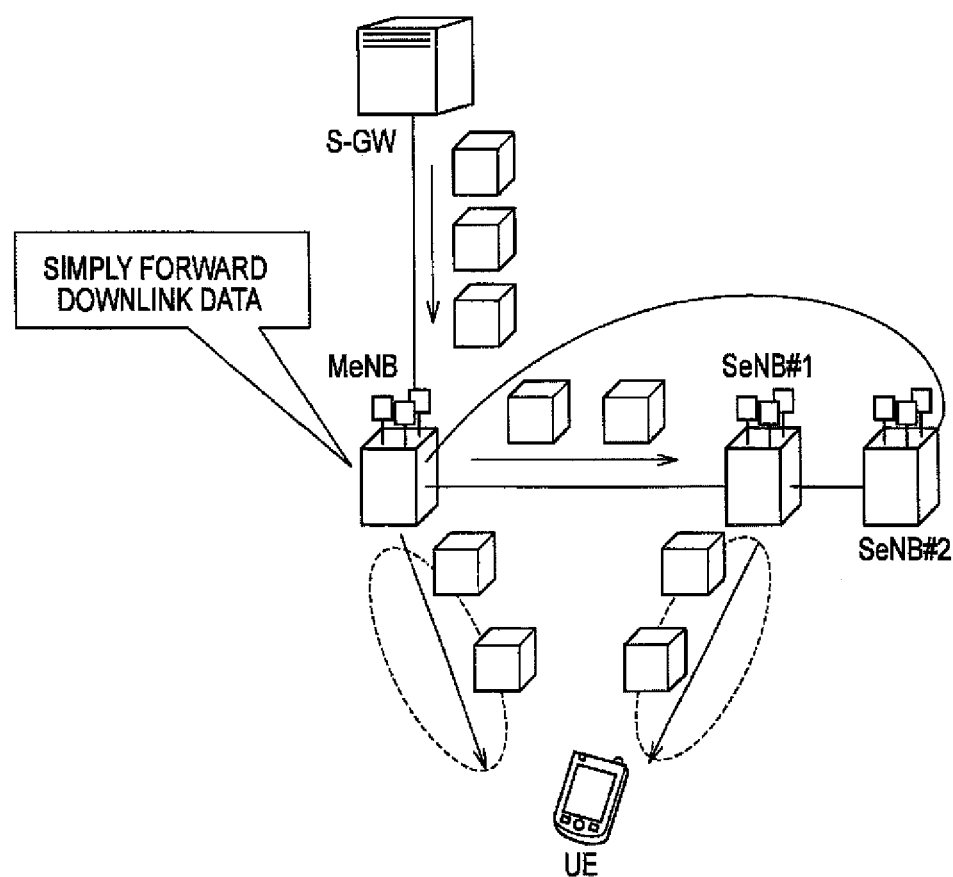
FIG. 9 is an overall configuration diagram of a mobile communication system (a radio station is an anchoring node) according to a third embodiment of the present invention.
Figure 10:
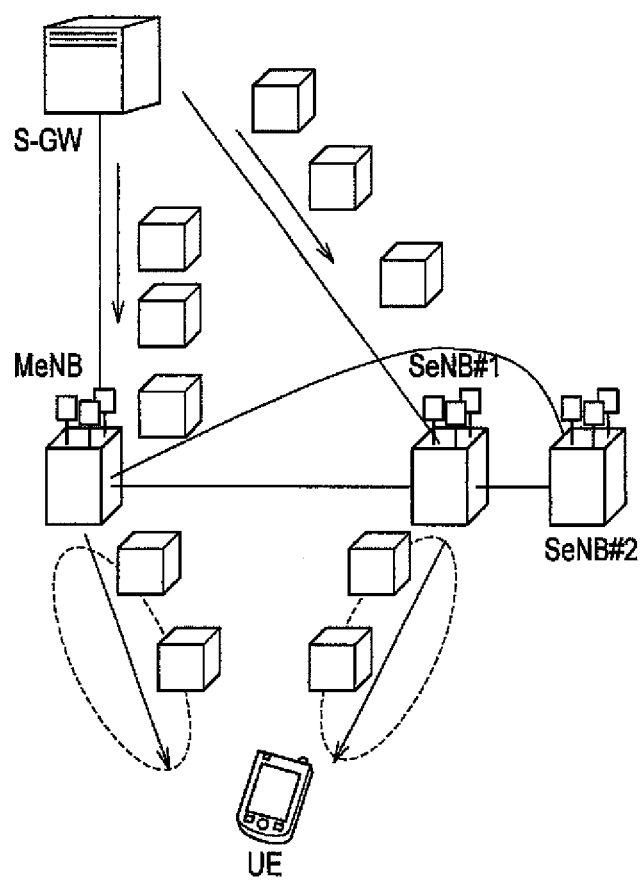
FIG. 10 is an overall configuration diagram of a mobile communication system (a gateway device is an anchoring node) according to the third embodiment of the present invention.

As illustrated in FIGS. 9 and 10, in the mobile communication system according to the present embodiment, in a state where the mobile station UE performs the "Inter-node UP aggregation" with the radio base station MeNB and the radio base station SeNB#1, the radio base station MeNB may be configured not to buffer entire downlink data to be transmitted via the radio base station SeNB#1 to the mobile station UE.

In other words, in this state, the radio base station MeNB is configured to be incapable of resending the mobile station UE the entire downlink data to be transmitted via the radio base station SeNB#1 to the mobile station UE.

Here, the radio base station MeNB is an anchoring node in an example of FIG. 9, and the gateway device S-GW is an anchoring node in an example of FIG. 10.

Further, the radio base station MeNB is not configured to forward copy of the above-described downlink data to the radio base station SeNB#1 but is configured to operate as a simple router, in the example of FIG. 9.

Hereinafter, an operation of the mobile communication system according to the present embodiment is described with reference to FIGS. 11 and 12. Specifically, with reference to FIGS. 11 and 12, description is provided for an operation of switching the radio base station SeNB from the radio base station SeNB#1 to the radio base station SeNB#2 when "Inter-node UP aggregation" is performed in the mobile communication system according to the present embodiment.

Figure 11:
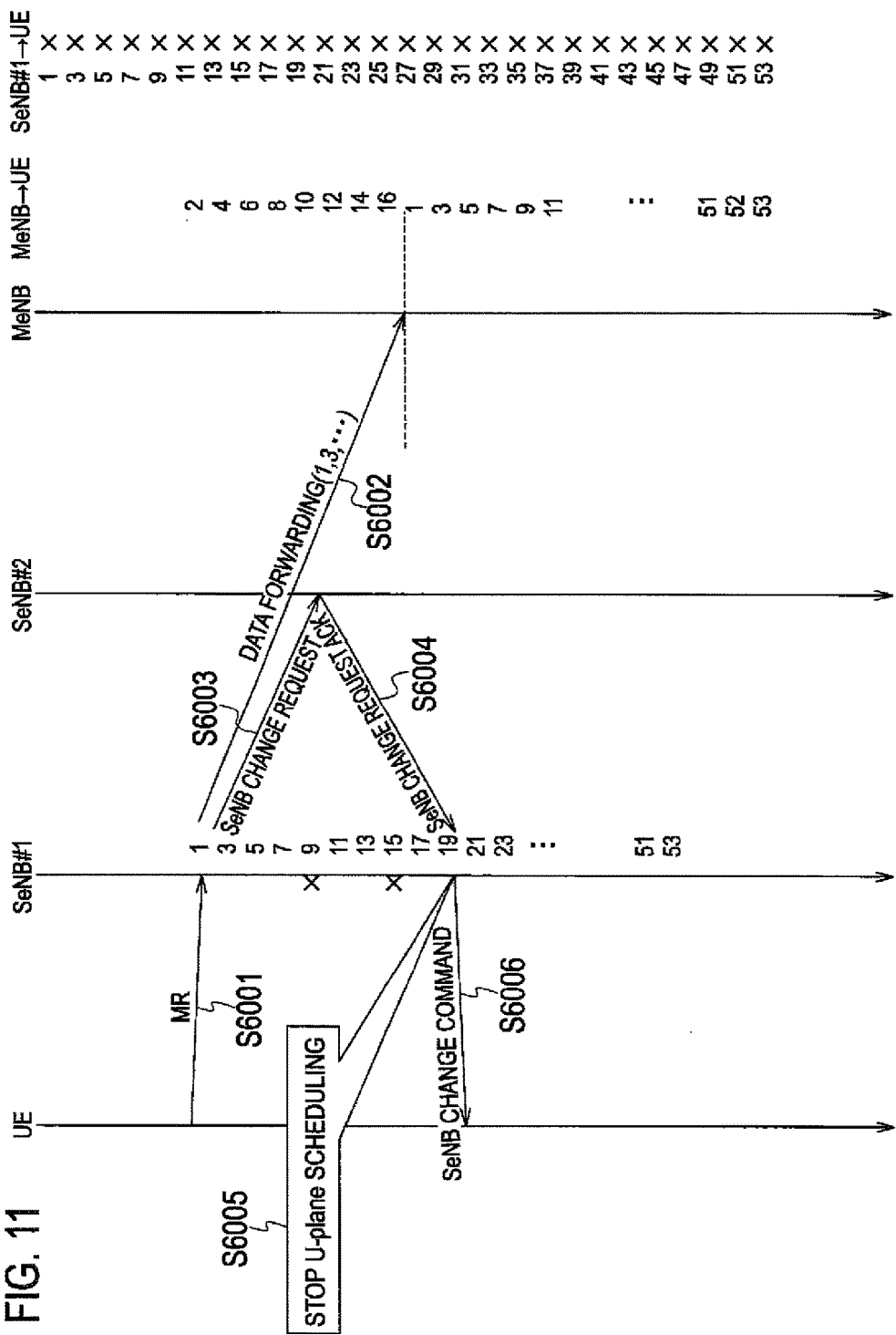
FIG. 11 is a sequence diagram illustrating an example of an operation by the mobile communication system according to the third embodiment of the present invention.

Firstly, with reference to FIG. 11, an operation example 1 of the mobile communication system according to the present embodiment is described.

As illustrated in FIG. 11, the radio base station SeNB#1 receives a "Measurement Report" from the mobile station UE at Step S6001, and determines to switch the radio base station SeNB from the radio base station SeNB#1 to the radio base station SeNB#2. Accordingly, the radio base station SeNB#1 forwards downlink data the transmission of which to the mobile station UE is not completed (in an example of FIG. 11, PDCP-PDUs of sequence numbers "1" to "53") to the radio base station MeNB at Step S6002, and sends the radio base station SeNB#2 an "SeNB change request" that requests switching of the radio base station SeNB at Step S6003.

Further, the radio base station SeNB#1 forwards, out of the downlink data (PDCP-PDUs) buffered in the received data buffer unit 24, the downlink data the transmission of which to the mobile station UE is not completed.

The radio base station MeNB resends the mobile station UE the downlink data (in the example of FIG. 11, PDCP-PDUs of sequence numbers "1" to "53") forwarded by the radio base station SeNB#1.

Thereafter, upon receiving an "SeNB change request ack" from the radio base station SeNB#2 at Step S6004, the radio base station SeNB#1 stops scheduling of downlink data to the mobile station UE at Step S6005, and sends an "SeNB change command" to the mobile station UE at Step S6006.

Further, in this operation example 1, the radio base station SeNB#1 may also discard downlink data forwarded to the radio base station MeNB.

Subsequent operations are similar to the operations (operations subsequent to the Path switch request) illustrated in FIG. 17.

Figure 12:
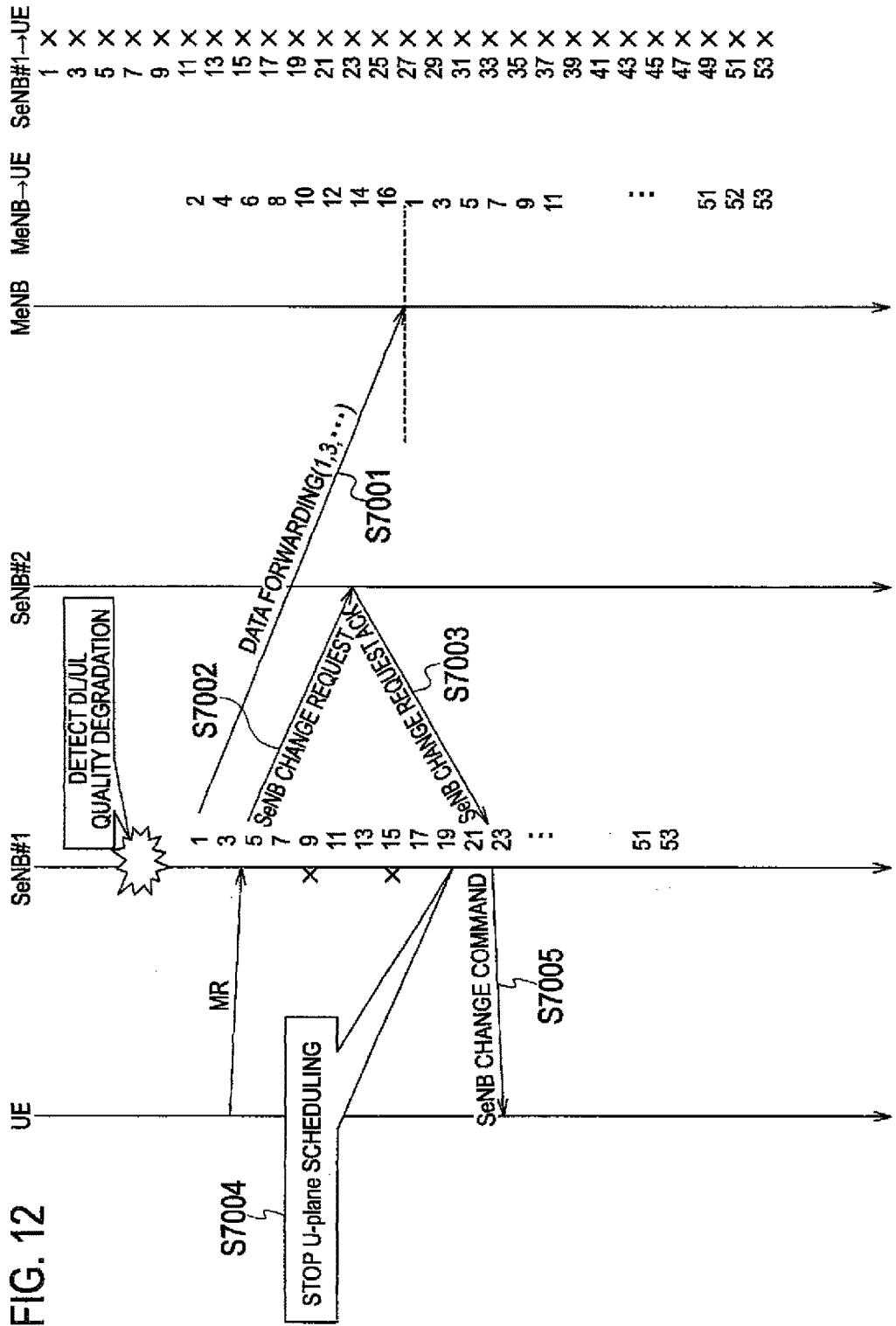
FIG. 12 is a sequence diagram illustrating another example of the operation by the mobile communication system according to the third embodiment of the present invention.
Figure 13:
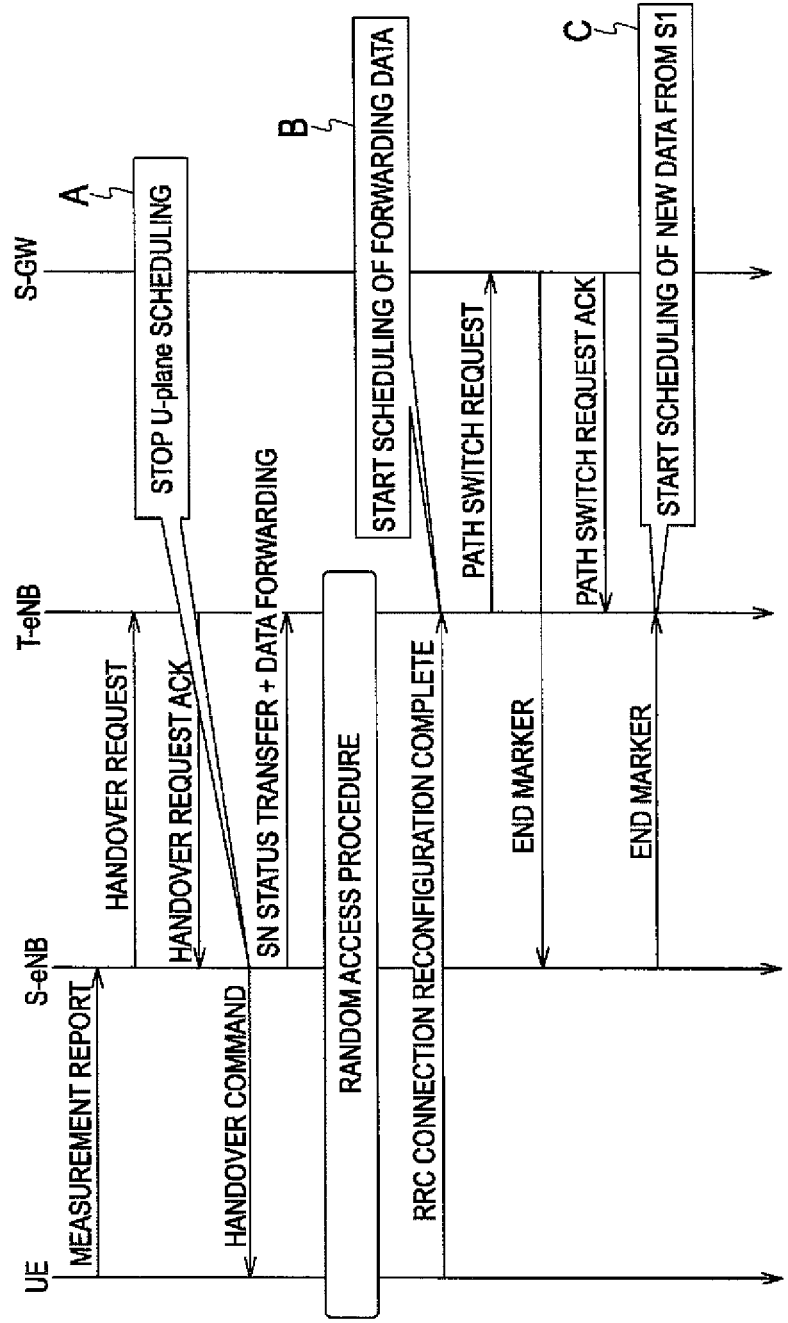
FIG. 13 is a diagram for explaining handover processing.
Figure 14:
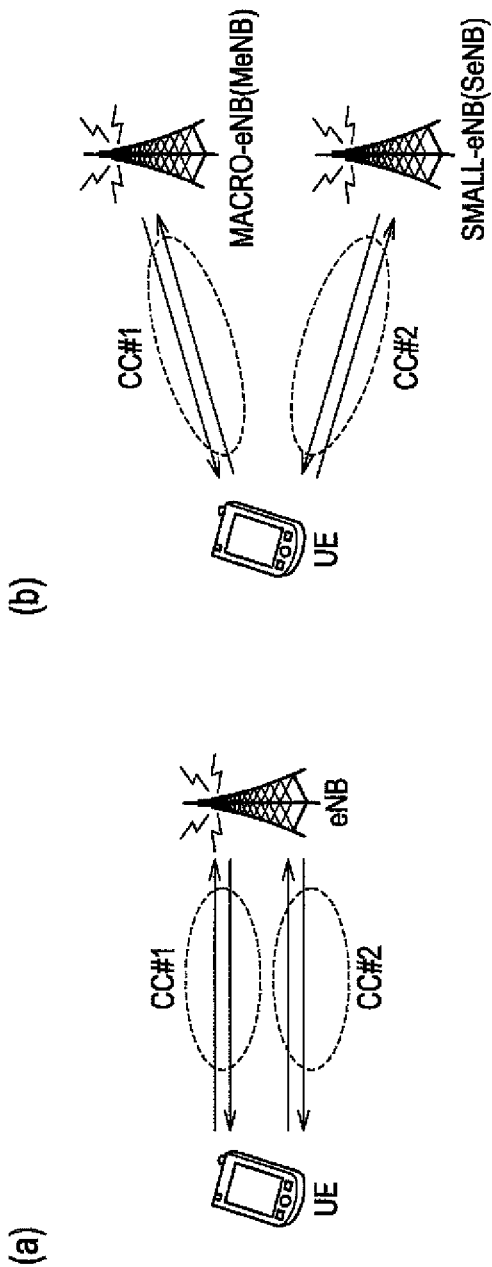
FIG. 14 is a diagram for explaining CA until Release-10 and "Inter-node UP aggregation".
Figure 15:
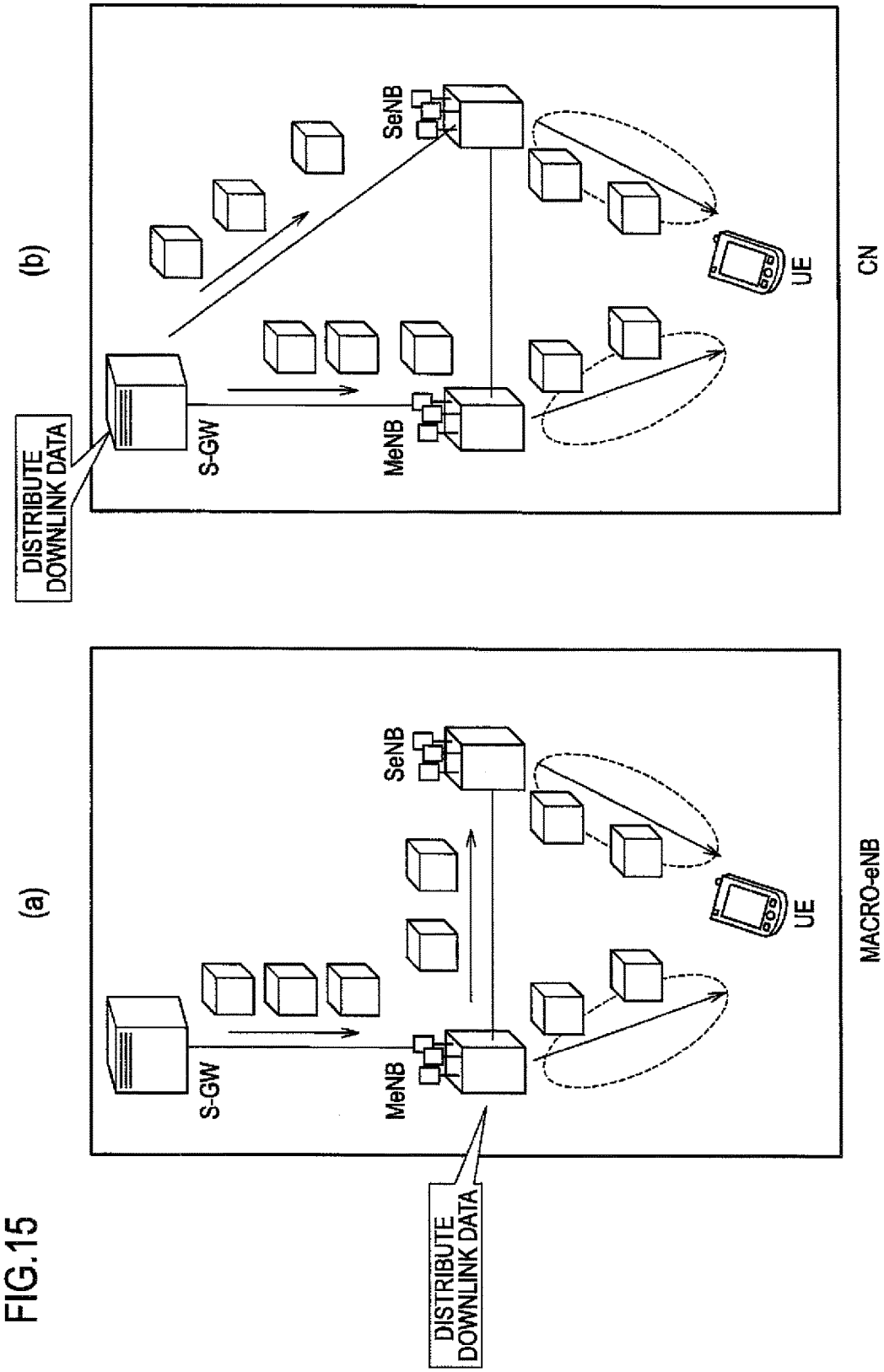
FIG. 15 is diagram for explaining distribution of downlink data in the "Inter-node UP aggregation".
Figure 16:
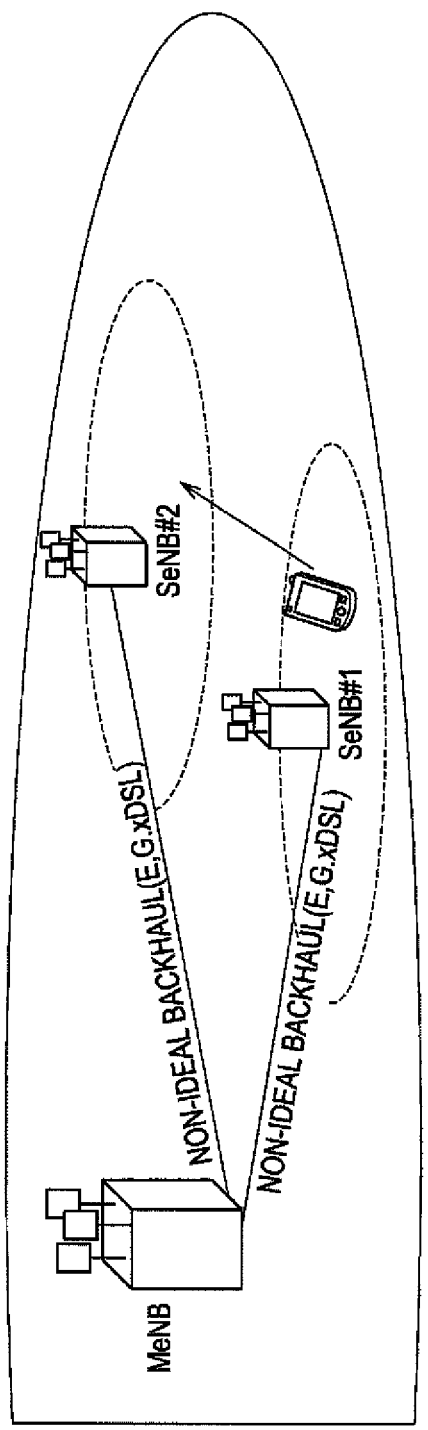
FIG. 16 is a diagram for explaining switching of a small-cell radio base station in the "Inter-node UP aggregation".

Secondly, with reference to FIG. 12, an operation example 2 of the mobile communication system according to the present embodiment is described.

As illustrated in FIG. 12, the radio base station SeNB#1 detects quality degradation of a radio link (down link and up link) with the mobile station UE, the radio base station SeNB#1 forwards downlink data (in an example of FIG. 12, PDCP-PDUs of sequence numbers "1" to "53") the transmission of which to the mobile station UE is not completed, to the radio base station MeNB at Step S7001.

The radio base station MeNB resends the downlink data (in the example of FIG. 12, PDCP-PDUs of sequence numbers "1" to "53") forwarded by the radio base station SeNB#1, to the mobile station UE.

Thereafter, the radio base station SeNB#1 receives a "Measurement Report" from the mobile station UE, and when determining to switch the radio base station SeNB from the radio base station SeNB#1 to the radio base station SeNB#2, sends the radio base station SeNB#2 an "SeNB change request" that requests switching of the radio base station SeNB at Step S7002.

Upon receiving an "SeNB change request ack" from the radio base station SeNB#2 at Step S7003, the radio base station SeNB#1 stops scheduling of downlink data to the mobile station UE at Step S7004, and sends an "SeNB change command" to the mobile station UE at Step S7005.

Further, in this operation example 2, the radio base station SeNB#1 may also discard downlink data forwarded to the radio base station MeNB.

Subsequent operations are similar to the operations (operations subsequent to the Path switch request) illustrated in FIG. 17.

According to the mobile communication system according to the present embodiment, at an early stage in the procedure where the radio base station SeNB is switched from the radio base station SeNB#1 to the radio base station SeNB#2 in the "Inter-node UP aggregation", the radio base station SeNB#1 forwards the downlink data, the transmission of which to the mobile station UE is not completed, to the radio base station MeNB that does not buffer entire downlink data destined for the mobile station UE. Accordingly, the present embodiment can prevent the occurrence of transmission delay of the downlink data to the mobile station UE.

The features of the present embodiment may also be expressed as follows.

A first feature of the present embodiment is summarized as a mobile communication method to be executed when a mobile station UE performs CA (carrier aggregation) using a macro cell under a radio base station MeNB (macro-cell radio base station) and a small cell under a radio base station SeNB#1 (first small-cell radio base station), the method including: buffering, by the radio base station MeNB, entire downlink data to be transmitted via the radio base station SeNB#1 to the mobile station UE; sending, by the radio base station SeNB#1, a radio base station SeNB#2 (second small-cell radio base station) an "SeNB change request (switching request)" that requests radio base station SeNB (small-cell radio base station) switching, when receiving a "Measurement Report (measurement report)" from the mobile station UE; stopping, by the radio base station SeNB#1, scheduling of downlink data to the mobile station UE, and sending the mobile station UE an "SeNB change command (switching instruction)" instructing the radio base station SeNB switching, when receiving an "SeNB change request ack (switching request response)" from the radio base station SeNB#2; notifying, by the mobile station UE, the radio base station MeNB of at least one of already received downlink data and unreceived downlink data in response to the "SeNB change command"; and resending, by the radio base station MeNB, the mobile station UE downlink data that is not received by the mobile station UE, in response to the notification.

A second feature of the present embodiment is summarized as a mobile communication method to be executed when a mobile station UE performs CA using a macro cell under a radio base station MeNB and a small cell under a radio base station SeNB#1, the method including: buffering, by the radio base station MeNB, entire downlink data to be transmitted via the radio base station SeNB#1 to the mobile station UE; notifying, by the mobile station UE, the radio base station MeNB of at least one of already received downlink data and unreceived downlink data, when sending a "Measurement Report" to the radio base station SeNB#1; resending, by the radio base station MeNB, the mobile station UE downlink data that is not received by the mobile station UE, in response to the notification; sending, by the radio base station SeNB#1, a radio base station SeNB#2 an "SeNB change request" that requests radio base station SeNB switching, when receiving the "Measurement Report" from the mobile station UE; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

A third feature of the present embodiment is summarized as a mobile communication method to be executed when a mobile station UE performs CA using a macro cell under a radio base station MeNB and a small cell under a radio base station SeNB#1, the method including: buffering, by the radio base station MeNB, entire downlink data to be transmitted via the radio base station SeNB#1 to the mobile station UE; notifying, by the mobile station UE, the radio base station MeNB of at least one of already received downlink data and unreceived downlink data, when detecting quality degradation of a radio link with the radio base station SeNB#1; resending, by the radio base station MeNB, the mobile station UE downlink data that is not received by the mobile station UE, in response to the notification; sending, by the radio base station SeNB#1, a radio base station SeNB#2 an "SeNB change request" that requests radio base station SeNB switching, when receiving a "Measurement Report" from the mobile station UE; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

A fourth feature of the present embodiment is summarized as a mobile communication method to be executed when a mobile station UE performs CA using a macro cell under a radio base station MeNB and a small cell under a radio base station SeNB#1, the method including: buffering, by the radio base station MeNB, entire downlink data to be transmitted via the radio base station SeNB#1 to the mobile station UE; sending, by the radio base station SeNB#1, a radio base station SeNB#2 an "SeNB change request" that requests radio base station SeNB switching, and notifying the radio base station MeNB of at least one of downlink data the transmission of which to the mobile station UE is completed and downlink data the transmission of which to the mobile station UE is not completed, when receiving a "Measurement Report" from the mobile station UE; resending, by the radio base station MeNB, the mobile station UE the downlink data the transmission of which to the mobile station UE is not completed, in response to the notification; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

A fifth feature of the present embodiment is summarized as a mobile communication method to be executed when a mobile station UE performs CA using a macro cell under a radio base station MeNB and a small cell under a radio base station SeNB#1, the method including: buffering, by the radio base station MeNB, entire downlink data to be transmitted via the radio base station SeNB#1 to the mobile station UE; notifying, by the radio base station SeNB#1, the radio base station MeNB of at least one of downlink data the transmission of which to the mobile station UE is completed and downlink data the transmission of which to the mobile station UE is not completed, when detecting quality degradation of a radio link with the mobile station UE; resending, by the radio base station MeNB, the mobile station UE the downlink data the transmission of which to the mobile station UE is not completed, in response to the notification; sending, by the radio base station SeNB#1, a radio base station SeNB#2 an "SeNB change request" that requests radio base station SeNB switching, when receiving a "Measurement Report" from the mobile station UE; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

A sixth feature of the present embodiment is summarized as a mobile communication method to be executed when a mobile station UE performs CA using a macro cell under a radio base station MeNB and a small cell under a radio base station SeNB#1, the method including: sending, by either one of the radio base station MeNB and a gateway device, downlink data via the radio base station SeNB#1 to the mobile station UE without buffering, by the radio base station MeNB, the downlink data; forwarding, by the radio base station SeNB#1, downlink data, the transmission of which to the mobile station UE is not completed, to the radio base station MeNB, and sending a radio base station SeNB#2 an "SeNB change request" that requests radio base station SeNB switching, when receiving a "Measurement Report" from the mobile station UE; resending, by the radio base station MeNB, the mobile station UE the downlink data forwarded by the radio base station SeNB#1; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

A seventh feature of the present embodiment is summarized as a mobile communication method to be executed when a mobile station UE performs CA using a macro cell under a radio base station MeNB and a small cell under a radio base station SeNB#1, the method including: sending, by either one of the radio base station MeNB and a gateway device, downlink data via the radio base station SeNB#1 to the mobile station UE without buffering, by the radio base station MeNB, the downlink data; forwarding, by the radio base station SeNB#1, downlink data, the transmission of which to the mobile station UE is not completed, to the radio base station MeNB, when detecting quality degradation of a radio link with the mobile station UE; resending, by the radio base station MeNB, the mobile station UE the downlink data forwarded by the radio base station SeNB#1; sending, by the radio base station SeNB#1, a radio base station SeNB#2 an "SeNB change request" that requests radio base station SeNB switching, when receiving a "Measurement Report" from the mobile station UE; and stopping, by the radio base station SeNB#1, scheduling of downlink data to the mobile station UE, and sending the mobile station UE an "SeNB change command" instructing the radio base station SeNB switching, when receiving an "SeNB change request ack" from the radio base station SeNB#2.

It should be noted that the foregoing operations of the mobile stations UE and the radio base stations MeNB, SeNB#1, and SeNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base stations MeNB, SeNB#1, and SeNB#2. Otherwise, the storage medium and the processor may be provided as discrete components inside the mobile stations UE and the radio base stations MeNB, SeNB#1, and SeNB#2.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-171400 (filed on Aug. 21, 2013) is incorporated by reference in the present specification.

INDUSTRIAL APPLICABILITY

As described above, according to the present invention, it is possible to provide a mobile communication method that can prevent the occurrence of transmission delay of the downlink data to the mobile station UE, in switching a radio base station SeNB from a radio base station SeNB#1 to another radio base station SeNB#2 in the "Inter-node UP aggregation".

EXPLANATION OF THE REFERENCE NUMERALS

S-GW gateway device
MeNB, SeNB#1, SeNB#2 radio base station
UE mobile station
11, 21 reception unit
12, 22 transmission unit
13, 23 CA management unit
14, 24 received data buffer unit
15, 25 reception status management unit

The invention claimed is:

1. A mobile communication method to be executed when a mobile station performs carrier aggregation using a primary cell under a primary-cell radio base station and a secondary cell under a first secondary-cell radio base station, the method comprising:
   buffering, by the primary-cell radio base station, entire downlink data to be transmitted via the first secondary-cell radio base station to the mobile station;
   sending, by the first secondary-cell radio base station, a second secondary-cell radio base station a switching request that requests secondary-cell radio base station switching, when receiving a measurement report from the mobile station;
   stopping, by the first secondary-cell radio base station, scheduling of downlink data to the mobile station, and send the mobile station a switching instruction instructing the secondary-cell radio base station switching, when receiving a switching request response from the second secondary-cell radio base station;
   notifying, by the mobile station, the primary-cell radio base station of at least one of already received downlink data and unreceived downlink data in response to the switching instruction; and
   resending, by the primary-cell radio base station, the mobile station downlink data that is not received by the mobile station, in response to the notification.

2. A mobile communication method to be executed when a mobile station performs carrier aggregation using a primary cell under a primary-cell radio base station and a secondary cell under a first secondary-cell radio base station, the method comprising:
   buffering, by the primary-cell radio base station, entire downlink data to be transmitted via the first secondary-cell radio base station to the mobile station;
   notifying, by the mobile station, the primary-cell radio base station of at least one of already received downlink data and unreceived downlink data, when sending a measurement report to the first secondary-cell radio base station;
   resending, by the primary-cell radio base station, the mobile station downlink data that is not received by the mobile station, in response to the notification;
   sending, by the first secondary-cell radio base station, a second secondary-cell radio base station a switching request that requests secondary-cell radio base station switching, when receiving the measurement report from the mobile station; and
   stopping, by the first secondary-cell radio base station, scheduling of downlink data to the mobile station, and sending the mobile station a switching instruction instructing the secondary-cell radio base station switching, when receiving a switching request response from the second secondary-cell radio base station.

3. A mobile communication method to be executed when a mobile station performs carrier aggregation using a primary cell under a primary-cell radio base station and a secondary, cell under a first secondary-cell radio base station, the method comprising:

- buffering, by the primary-cell radio base station, entire downlink data to be transmitted via the first secondary-cell radio base station to the mobile station;
- notifying, by the mobile station, the primary-cell radio base station of at least one of already received downlink data and unreceived downlink data, when detecting quality degradation of a radio link with the first secondary-cell radio base station;
- resending, by the primary-cell radio base station, the mobile station downlink data that is not received by the mobile station, in response to the notification;
- sending, by the first secondary-cell radio base station, a second secondary-cell radio base station a switching request that requests secondary-cell radio base station switching, when receiving a measurement report from the mobile station; and
- stopping, by the first secondary-cell radio base station, scheduling of downlink data to the mobile station, and sending the mobile station a switching instruction instructing the secondary-cell radio base station switching, when receiving a switching request response from the second secondary-cell radio base station.

4. A mobile communication method to be executed when a mobile station performs carrier aggregation using a primary cell under a primary-cell radio base station and a secondary cell under a first secondary-cell radio base station, the method comprising:

- buffering, by the primary-cell radio base station, entire downlink data to be transmitted via the first secondary-cell radio base station to the mobile station;
- sending, by the first secondary-cell radio base station, a second secondary-cell radio base station a switching request that requests secondary-cell radio base station switching, and notifying the primary-cell radio base station of at least one of downlink data the transmission of which to the mobile station is completed and downlink data the transmission of which to the mobile station is not completed, when receiving a measurement report from the mobile station;
- resending, by the primary-cell radio base station, the mobile station the downlink data the transmission of which to the mobile station is not completed, in response to the notification; and
- stopping, by the first secondary-cell radio base station, scheduling of downlink data to the mobile station, and sending the mobile station a switching instruction instructing the secondary-cell radio base station switching, when receiving a switching request response from the second secondary-cell radio base station.

5. A mobile communication method to be executed when a mobile station performs carrier aggregation using a primary cell under a primary-cell radio base station and a secondary cell under a first secondary-cell radio base station, the method comprising:

- buffering, by the primary-cell radio base station, entire downlink data to be transmitted via the first secondary-cell radio base station to the mobile station;
- notifying, by the first secondary-cell radio base station, the primary-cell radio base station of at least one of downlink data the transmission of which to the mobile station is completed and downlink data the transmission of which to the mobile station is not completed, when detecting quality degradation of a radio link with the mobile station;
- resending, by the primary-cell radio base station, the mobile station the downlink data the transmission of which to the mobile station is not completed, in response to the notification;
- sending, by the first secondary-cell radio base station, a second secondary-cell radio base station a switching request that requests secondary-cell radio base station switching, when receiving a measurement report from the mobile station; and
- stopping, by the first secondary-cell radio base station, scheduling of downlink data to the mobile station, and sending the mobile station a switching instruction instructing the secondary-cell radio base station switching, when receiving a switching request response from the second secondary-cell radio base station.

6. A mobile communication method to be executed when a mobile station performs carrier aggregation using a primary cell under a primary-cell radio base station and a secondary cell under a first secondary-cell radio base station, the method comprising:

- sending, by either one of the primary-cell radio base station and a gateway device, downlink data via the first secondary-cell radio base station to the mobile station without buffering, by the primary-cell radio base station, the downlink data;
- forwarding, by the first secondary-cell radio base station, downlink data, the transmission of which to the mobile station is not completed, to the primary-cell radio base station, and sending a second secondary-cell radio base station a switching request that requests secondary-cell radio base station switching, when receiving a measurement report from the mobile station;
- resending, by the primary-cell radio base station, the mobile station the downlink data forwarded by the first secondary-cell radio base station; and
- stopping, by the first secondary-cell radio base station, scheduling of downlink data to the mobile station, and sending the mobile station a switching instruction instructing the secondary-cell radio base station switching, when receiving a switching request response from the second secondary-cell radio base station.

7. A mobile communication method to be executed when a mobile station performs carrier aggregation using a primary cell under a primary-cell radio base station and a secondary cell under a first secondary-cell radio base station, the method comprising:

- sending, by either one of the primary-cell radio base station and a gateway device, downlink data via the first secondary-cell radio base station to the mobile station without buffering, by the primary-cell radio base station, the downlink data;
- forwarding, by the first secondary-cell radio base station, downlink data, the transmission of which to the mobile station is not completed, to the primary-cell radio base station, when detecting quality degradation of a radio link with the mobile station;
- resending, by the primary-cell radio base station, the mobile station the downlink data forwarded by the first secondary-cell radio base station;
- sending, by the first secondary-cell radio base station, a second secondary-cell radio base station a switching request that requests secondary-cell radio base station switching, when receiving a measurement report from the mobile station; and
- stopping, by the first secondary-cell radio base station, scheduling of downlink data to the mobile station, and sending the mobile station a switching instruction instructing the secondary-cell radio base station switching, when receiving a switching request response from the second secondary-cell radio base station.

\* \* \* \* \*